Feb. 26, 1924.
J. WILLIAMSON
1,484,747
LIGHTING FIXTURE STEM
Filed July 28, 1922
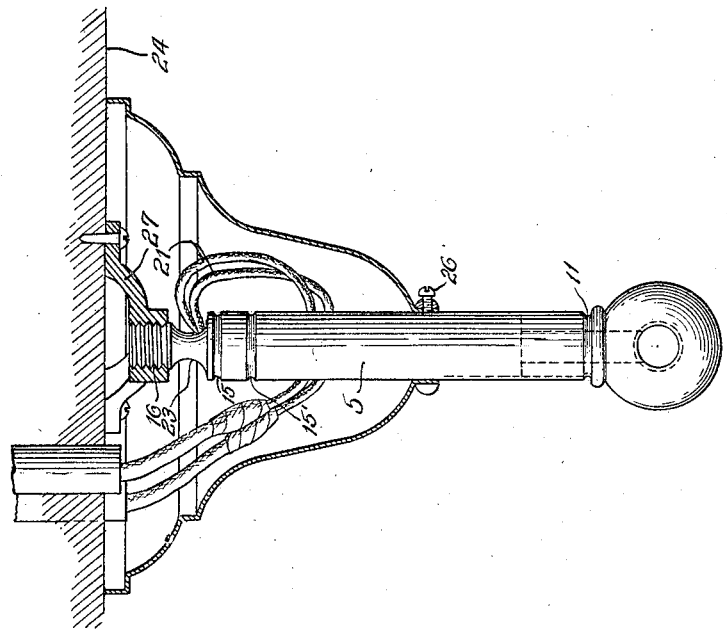
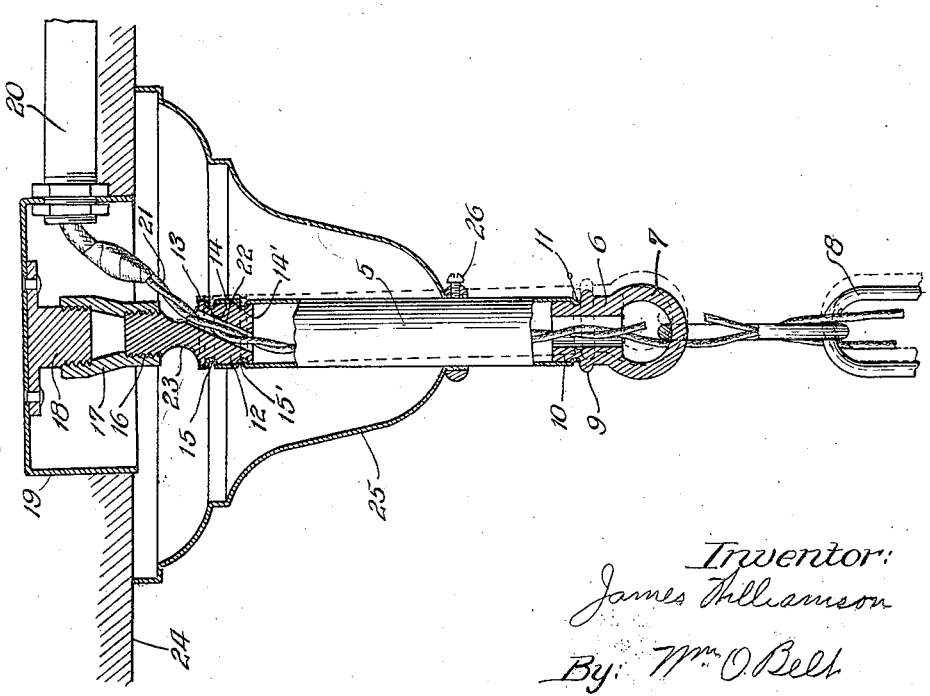
Inventor:
James Williamson
By: Wm. O. Bell
Atty.

Patented Feb. 26, 1924.

1,484,747

UNITED STATES PATENT OFFICE.

JAMES WILLIAMSON, OF CHICAGO, ILLINOIS, ASSIGNOR TO R. WILLIAMSON & COMPANY, OF CHICAGO, ILLINOIS, A CORPORATION OF ILLINOIS.

LIGHTING-FIXTURE STEM.

Application filed July 28, 1922. Serial No. 578,076.

*To all whom it may concern:*

Be it known that I, JAMES WILLIAMSON, a citizen of the United States, residing at Chicago, in the county of Cook and State of Illinois, have invented certain new and useful Improvements in Lighting-Fixture Stems, of which the following is a specification.

It is customary to provide a stem for connecting a chandelier or other lighting fixture to the junction box, crow-foot or other wiring installation set in a ceiling or side wall and difficulty is often experienced in making the fixture hang or project squarely because the wiring installation has been improperly or carelessly performed. It happens with more or less frequency that the junction box or crow-foot is not properly set and in order to position the fixture squarely it becomes necessary to force or bend some of the parts which, in the absence of special provision, very often results in serious damage to the parts.

It is the object of my invention to provide a stem which can be easily bent when required for adjusting the stem to position the fixture squarely with reference to the ceiling from which it hangs or to the wall from which it projects, and which is strong and substantial in construction and capable of being so bent without loosening, breaking or otherwise damaging any of the parts.

And a further object of the invention is to provide a stem which can be wired before the canopy is applied thereto to facilitate the assembly of the parts.

In the accompanying drawings:

Fig. 1 is a sectional elevation illustrating my invention applied to a junction box which is installed in a ceiling in a crooked position; and Fig. 2 is a plan view, partly in section, showing the invention connected to a crow-foot installation in a side wall.

Referring to Fig. 1 of the drawings, which illustrates a selected embodiment of the invention, the stem comprises a tubular body 5 provided at its lower end with a tubular plug 6 having an eye 7 for engagement with a chain 8 which suspends the chandelier or other lighting fixture. The plug 6 is provided with an annular shoulder 9 and with an annular groove 10 adjacent to the shoulder. The plug fits within the lower end of the tubular body which abuts against the shoulder 9 and the body is pressed into the groove at 11 to form an interlocking engagement between the body and the eye plug.

A connecting plug 12 is arranged within the upper end of the tubular body and it is provided with a shoulder 13 and also with a groove 14 located adjacent to the shoulder and with a groove 14' spaced from the groove 14. The tubular body is pressed into the grooves 14, 14' as shown at 15, 15' to make interlocking engagement between the body and the plug and the upper end of the body abuts against the annular shoulder 13. I have found it satisfactory in practice to engage the two plugs with the tubular body in the manner described but my invention is not limited to this particular engaging means and other means may be substituted if found desirable.

The upper end of the connecting plug is screw threaded at 16 to engage a connecting sleeve 17 which threadedly engages the plug 18 of the junction box 19. This junction box is shown mounted on the end of a conduit 20 or it may be located intermediate of a conduit or in any other usual manner of wiring and the electric conductor wires 21 extend from the conduit 20 down through a channel 22 in the connecting plug and through the body and the eye plug to the chandelier.

Due to difficulties in installation or to carelessness of the workmen it happens more or less frequently that the junction box is improperly set and the plug 18 projects crookedly to the perpendicular. If no adequate provision is made for adjusting the stem to compensate for the angular projection of the junction box plug it will be impossible to properly hang the fixture and, as before stated, it has been customary heretofore to force the parts until the fixture does hang straight and in so doing the threaded connections are liable to be damaged and result in a loose installation or the parts are liable to be injured to such an extent that the installation of the fixture is imperfectly and inefficiently effected. My invention avoids these difficulties by making provision for sufficient bending adjustment for all ordinary installations which can be made without liability of damaging or loosening any of the parts. For this purpose I provide the connecting plug with a narrow contracted neck 23 intermediate of the shoulder 13 and the threaded part 16 which latter engages the sleeve 17.

To illustrate the practical advantages of my invention in a junction box installation I have shown the junction box set crookedly in the ceiling 24. The plug 18 projects angularly with respect to the perpendicular and if no provision is made for adjusting the stem the latter would extend in alignment with the plug 18, as indicated in dotted lines, and the fixture would hang out of position and present an unattractive appearance. But after the installation is made and the fixture is hung the stem can be adjusted to desired position by bending the stem at the neck 23 so that the stem will hang perpendicularly regardless of the position of the plug 18 and the sleeve 17. When the stem is thus perpendicularly adjusted the canopy 25 can be secured squarely against the ceiling, in proper position by the adjusting screw 26, thus making a correct and attractive installation of the lighting fixture.

The channel 22 for the electric conductor wires is disposed in the connection plug so that its upper end will open at the neck 23 and this is desirable since it enables the stem to be wired before the canopy is applied. The projecting portions of the wires 21 can be wound around the neck or laid alongside the reduced threaded end 16 of the plug to permit the canopy to be applied to the stem as will be readily understood by reference to the drawings, and this facilitates the assembly of the parts.

In Fig. 2 I have shown the invention applied to a crow-foot 27 to a knob and tube wiring installation in a side wall, the stem projecting outwardly therefrom in the same manner as the stem in Fig. 1 projects downwardly from the ceiling. If a crow-foot is angularly installed the stem would project therefrom at a corresponding angle to the wall which would would be objectionable. The contracted neck 23 enables the stem to be bent easily for adjustment to a position square to the wall. It will be understood that the crow-foot may be used in a ceiling and a junction box may be used in a side wall.

My invention provides a simple means whereby the stem can be adjusted to an improperly set junction box or crow-foot by simply bending the stem at the weakened neck provided for that purpose without liability of damaging or loosening the threads or any of the connections between the several parts. I prefer to provide the two angular interlocking engagements between the inner end of the stem body and the connecting plug because the greater strain takes place at this end of the tubular body and it is desirable to insure against possible loosening of the connection between the body and the connecting plug, but I have found that the single interlocking engaging groove at the lower end of the body for connecting the body with the eye plug is sufficient.

I am aware that changes in the form and proportion of parts and in the details of construction of my invention may be made without departing from the spirit or sacrificing any of the parts thereof and I reserve the right to make all such changes as fairly fall within the scope of the following claims:

I claim:

1. A lighting fixture stem comprising a tubular supporting conduit, a plug secured in one end of the conduit and having a contracted neck adjacent said end of the conduit, there being a channel for conductor wires extending through that portion of the plug within the conduit and opening at one end in said neck.

2. A lighting fixture stem comprising a supporting conduit, a plug secured in said conduit and having a contracted neck adjacent the end of the conduit and an end beyond the neck adapted for engagement with a wiring installation, said end being of less diameter than that portion within the conduit and the latter portion having one end open at the neck to receive conductor wires.

JAMES WILLIAMSON.